INVENTOR
JOHN ROBELL

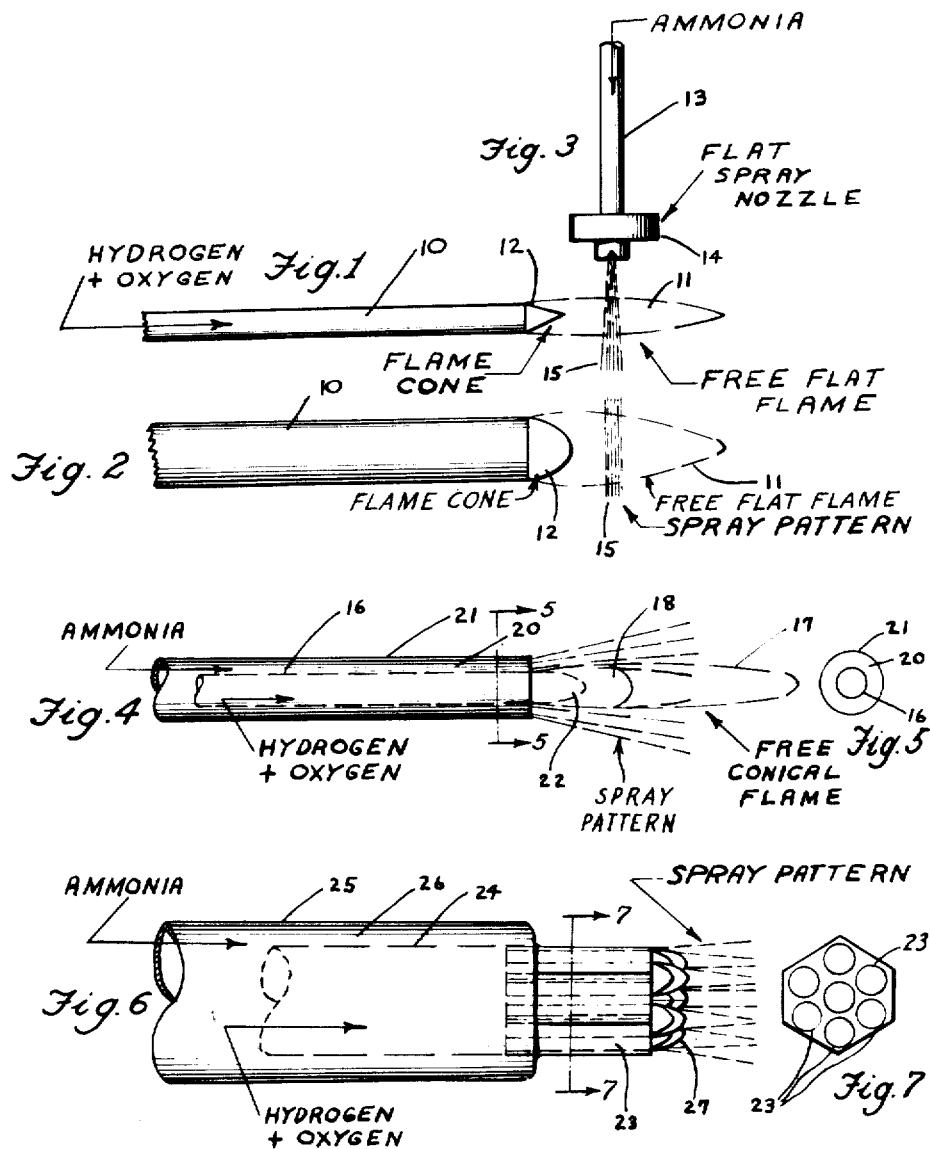

United States Patent Office 2,779,660
Patented Jan. 29, 1957

2,779,660
METHOD OF PRODUCING HYDRAZINE

John Robell, West Hempstead, N. Y., assignor to Guggenheim Brothers (1949), a copartnership Application February 9, 1952, Serial No. 270,821

5 Claims. (Cl. 23—190)

This invention relates to chemistry and has for an object the provision of an improved process for producing chemical compounds. More particularly, the invention contemplates the provision of a process for subjecting various chemical compounds to the action of various reagents at elevated temperatures to produce, in the gaseous state, valuable products of decomposition and transformation and comprising in different arrangements and proportions atoms contained in the original chemical compounds.

The terms "reaction," "decomposition" and "transformation" are used herein as substantial equivalents in order to cover the fields of direct chemical reaction, decomposition and polymerization or re-combination, among others. In some of its more specific aspects the invention is concerned with the conversion of saturated or stable compounds to unsaturated and relatively unstable or more highly reactive compounds.

The invention provides a process of the type in which bodies or streams of fluid reagents are brought into reacting relationships under conditions such as to promote desired reactions, decompositions or transformations with the production of bodies of gases containing products of the reactions, decompositions or transformations, and, thereafter, the gaseous products of the reactions, decompositions or transformations are subjected to conditions that promote or insure the preservation and recovery of the desired products. Thus, for example, the invention provides a process in which a chemical compound or radical or other component of a high-temperature body of gas requiring for its production a temperature higher than its maximum temperature of stability, or its decomposition temperature, and at which it necessarily exists in the gaseous state is cooled rapidly to a temperature below its maximum temperature of stability, or below its decomposition temperature.

The fluid reagents are intimately mixed in a high-temperature reaction zone, and the gaseous reaction product is conducted to a relatively low-temperature cooling and stabilizing zone. The rates of flow of the fluid reagents and the fluid reaction product, the temperature of the reaction zone, and the temperature of the cooling and stabilizing zone are so regulated that sufficient time is allowed to provide the energy and develop the temperature required to produce a suitable rate and degree of reaction between the reagents and a suitable yield of the desired reaction product, and cooling of the desired reaction product to a temperature below its maximum temperature of stability, or below its decomposition temperature, is effected before an undesirable degree of decomposition of a desired reaction product can take place.

The energy required for producing temperatures and effecting reactions may be provided in any suitable manner, as, for example, by means of open flames, by means of electric arcs established and maintained in contact with the reagents, by means of electric resistance elements disposed in the high-temperature reaction zones in contact with the reagents, by means of hot solid surfaces heated electrically or by combustion means, or by means of any two or more of such sources of energy.

Intimate mixing of the reagents to provide for effective reaction may be effected in any suitable manner. In order to effect suitably intimate mixing, I may employ extraneous mechanical mixing means, I may rely upon the effects produced through the introduction into the reaction zone of fluid reagents at different angles, at different rates of speed, under different pressures, or in different fluid physical states, I may utilize the turbulence created by temperature changes or temperature changes and resulting changes of physical state (as from liquid to gas), or by changes of direction, or, I may utilize a combination of such factors.

The speed of removal of the desired reaction product and its associated gaseous reaction products will be determined by the rate and state of introduction of the reagents into the high-temperature reaction zone coupled, necessarily, with the effectiveness of means provided for permitting the flow of the gaseous reaction products from the high-temperature reaction zone to the low-temperature cooling and stabilization zone.

The speed employed for the flow of fluid reagents into the high-temperature reaction zone or the speed employed for the flow of gaseous reaction products from the immediate zone of reaction, or both, will be determined by the characteristics of the reaction products, particularly with respect to their rates of production and their actual or potential rates and times or periods of decomposition. When the rate of production of a desirable reaction product is high, the rate of introduction of reagents into the reaction zone and the rate of removal of reaction products from the reaction zone to the cooling and stabilizing zone should be high. If, on the other hand, the rate of production of a desirable reaction product is low, the rate of introduction of the reagents into the reaction zone may be low and the rate of removal of the reaction products may be relatively low. In the latter case, the predetermined rates of introduction and removal will depend, largely, upon the characteristics of the reaction products with respect to their lives or actual or potential rates and times or periods of decomposition at their temperature of production. When the rate of production exceeds the rate of decomposition at the temperature of production, the rate of removal may be reduced within the limits of economic factors. Of course, it is to be understood that the rates of introduction and removal referred to herein are relative, as the term "rate" implies, and they are not to be carelessly confused with speeds of flow, for, obviously, a quantity of fluid material introduced into a high-temperature reaction zone at a relatively low temperature may have its volume multiplied so that its rate of discharge through an outlet of the same cross-sectional area as the inlet may have its speed of flow multiplied in some proportion.

Dissipation of the sensible heat of the gaseous reaction product to provide for cooling and stabilization may be provided for in any suitable manner. Thus, for example, a fluid-cooled heat exchanger or other chilling means may be so disposed with respect to the zone of reaction as to permit either immediate or suitably delayed contact with the gaseous reaction products. Such a fluid-cooled heat exchanger should be so designed with respect to contact surfaces and cooling fluid flow as to permit effective heat absorption, whether the sensible heat of gases at a fixed pressure or the sensible heat of gases subjected to sudden expansion. Preferably, such a heat exchanger should be provided and associated with means permitting the use of a liquid having a high heat of vaporization at a temperature below the stabilizing temperature of the reaction products in order to provide for effective use in cooling of the heat absorption capacity resulting from the heat of vaporization.

In suitable cases, one or more of the reagents may be introduced in excess into or immediately adjacent to the reaction zone at a temperature lower than the temperature of reaction to provide for or promote effective cooling and stabilization of the desired reaction product. Such one or more reagents can be employed effectively in the liquid state to permit the utilization for cooling and stabilization purposes of the cooling effect resulting from the absorption of heat required for its vaporization or expansion. Similarly, a chemically non-reactive liquid substance having a high heat of vaporization such, for example, as water can be introduced into the reaction zone to permit utilization for cooling and stabilization purposes of the cooling effect resulting from the absorption of heat required for its vaporization.

The invention provides an effective process for converting or transforming stable or unsaturated compounds such as hydrocarbons and ammonia into relatively unstable or unsaturated compounds.

Among the preferred processes of my invention is that involving the use of an open combustion flame as a source of energy for producing temperatures and effecting reactions and transformations. The flame may function solely to provide heat for promoting one or more desired chemical reactions or transformations in the high-temperature reaction or transformation zone through its influence on a single compound or through its influence on two or more compounds or agents, or, the natures of the combustible material and the oxidizing material employed in producing the flame may be such as to result in providing heat for promoting the one or more desired chemical reactions or transformations and, also, in providing one or more chemical agents or reagents that promote or enter into the desired chemical reactions or transformations. In a process employing an open combustion flame, one or more of the same or additional compounds or reagents that may be required for producing a desired end product are contacted with the flame in the form of a high-speed or high-velocity stream or body of gas. Preferably, the highest velocity portion of the stream is brought into direct contact with the flame.

The high-speed stream of gas comprising a compound to be modified or transformed may be employed as a flame quenching agent, either alone or in conjunction with other quenching or cooling means, to reduce the temperature of the gaseous reaction product and effect stabilization or prevent decomposition of the desired product. The burning gas velocity should be between the velocity at which the flame will strike back and the velocity at which it will blow off. The speed or velocity of the body or stream of gas and its point or manner of contact with the flame should be such as to provide effectively for utilizing the heat energy of the flame while, at the same time, providing for sufficiently rapid cooling of the desired reaction or transformation product to effect its stabilization or prevent its decomposition. The speed or velocity of the stream of gas used for quenching may be in either the subsonic range or the supersonic range. Preferably the speed or velocity of the stream of gas used for quenching or for quenching and reaction or transformation should be in excess of one thousand feet per second. In approaching the sonic range, shock waves may be encountered or developed, so I prefer to operate at speeds somewhat below or above the sonic range to provide for smooth reaction and the production of uniform results. The gas employed for quenching may be preheated to a temperature below the decomposition temperature of the one or more compounds or reagents contained therein, if desired, in order more effectively to promote reaction or transformation in that portion of the stream or body that contacts the flames at the desirable reaction or transformation temperature.

The high-speed stream or body of quenching gas may be contacted with the flame in any suitable manner. According to a preferred method of practicing the invention, the stream of quenching gas is formed as a flat spray having, in cross-section, short and long axes, and it is directed into contact with the flame in such manner that its long axis intersects the longitudinal axis of the flame. Highly effective contact may be achieved when the long axis of the spray and the median plane of the spray form right angles with the longitudinal axis of the flame and when contact is made immediately adjacent to the surface of the inner cone of the flame.

A flat flame or a normally conical flame may be employed. The long axis of the spray may, advantageously, be greater in length than the width of the flame.

According to another preferred method of practicing the invention, the flame and the stream of quenching gas are employed in a co-axial relationship. A normally conical flame is formed and the stream of quenching gas is formed as an envelope surrounding the flame with a longitudinal axis coinciding with the longitudinal axis of the flame. Preferably, the enveloping stream of gas is directed into contact with the flame immediately adjacent to the surface of the inner cone of the flame.

The surface of the flame or other heated element or source of heat energy should be of such length or quality or have such characteristics that the time of contact of the compound to be modified with the source of heat energy should be shorter than one one-hundredth of a second and, in the case of compounds like hydrazine, should be one ten-millionth of a second or shorter.

When the compound to be modified or transformed is used in developing the combustion flame, an additional quantity of the compound at a relatively low temperature may be introduced into the stream of gases resulting from combustion in order to effect cooling and further reaction, modification or transformation.

In the preferred form of my invention, I employ a combustion flame produced by oxidation with oxygen, air or oxygen-enriched air of hydrogen or a saturated hydrocarbon. The resulting gaseous product, when quenched with ammonia or with a saturated hydrocarbon compound will yield products comprising unsaturated hydrogen-nitrogen compounds or unsaturated hydrocarbon compounds.

The invention is of particular importance with respect to hydrazine production which can be effected through transformation of ammonia. Therefore, it will be described hereinafter with respect to its utilization in hydrazine production within the utilization of principles and factors hereinbefore pointed out and discussed.

The present invention, in so far as it relates to the production of hydrazine, is based on my discovery that substantial amounts of hydrazine are produced when a combustible gas is burned with air, pure oxygen or oxygen-enriched air and the resulting flame is quenched and the products of combustion are cooled or chilled by means of a high-velocity stream or body of ammonia.

I have found that greater or lesser amounts of hydrazine are produced from practically any gas burning with oxygen or air when the flame is quenched with a high velocity stream of ammonia. Among the combustible gases employed are hydrogen, acetylene, ammonia, methane, ethane, propane, butane and carbon monoxide. These gases can either be premixed with oxygen before allowing them to burn or fed separately to a suitable diffusion type burner.

I prefer to use hydrogen as the combustible gas. When hydrocarbons such as methane are used, the yield of hydrazine is about the same as when using hydrogen; however, carbon dioxide is formed which combines with ammonia to form undesirable solid compounds such as ammonium carbonate or carbamate, and the ammonia thus combined cannot be used directly for recycling.

I have found that the yield of hydrazine increases as the linear velocity of ammonia used for quenching the flame is increased and that, within certain limits, this yield is independent of the volumetric ratio of ammonia to oxygen used. However, enough ammonia should be used to cool the products of combustion to a temperature low enough so that the hydrazine formed is stable and will not decompose thermally.

I have found, for instance, when using hydrogen as the combustible gas, that the ratio of hydrogen to oxygen has little effect on the yield of hydrazine. This ratio has been varied between the limits 0.6 and 3.7 which are approximately the limits suitable for or capable of maintaining a flame which will still burn when quenched by a high velocity stream of ammonia. It is preferred to work at the stoichiometric ratio of hydrogen to oxygen in order to produce a very stable flame.

I have found that hydrazine is produced whether liquid or gaseous ammonia is used. However, increased yields are obtained with gaseous ammonia. A further increase in the yield is obtained if both the ammonia and the gases used for producing the flame are preheated.

I have found, also, that the yields are increased when quenching at the shortest possible distance from the base of the flame.

Three possible mechanisms could explain the formation of hydrazine in the process:

1. *The radical mechanism.*—In this mechanism, radicals such as OH, H or O produced in the flame may combine with an ammonia molecule to form imine and amine or both radicals. These imine (NH) and amine (NH$_2$) radicals can then produce hydrazine, for instance according to the following equations:

$$NH_2 + NH_2 = N_2H_4$$
$$NH + NH_3 = N_2H_4$$

The overall reaction could be written as follows $$2NH_3 + \text{radicals from flame} = N_2H_4 + H_2O \text{ (or } H_2\text{)}$$

2. *The thermal cracking mechanism.*—Under this theory, an ammonia molecule heated to a high temperature by the flame may break down into radicals which recombine to give hydrazine:

$$NH_3 = NH_2 \text{ or } NH + H \text{ or } H_2$$

then $$NH_2 + NH_2 = N_2H_4$$
$$NH + NH_3 = N_2H_4$$

The overall reaction could be written as follows $$2NH_3 = N_2H_4 + H_2$$

3. *The oxidation mechanism.*—This mechanism postulates the direct oxidation of ammonia to hydrazine and water as follows:

$$4NH_3 + O_2 = 2N_2H_4 + 2H_2O$$

Among the above-mentioned possible mechanisms which may explain the formation of hydrazine, the radical mechanism seems to be the most probable under the conditions of the process. Furthermore, it is believed that the hydroxyl radical (OH) formed in the flame actually is the active radical which reacts with ammonia, producing hydrazine directly or through intermediate steps.

In a preferred method of operation for the production of hydrazine, 2 volumes of hydrogen are mixed with 1 volume of oxygen and the mixture is ignited at the tip of a suitable flat ended burner which produces a flat sheet of flame. A flat stream of gaseous ammonia emerging from a suitable nozzle is directed at right angles to the center line of the burner tube and quenches the flame. The stream of quenching ammonia should be as close to the tip of the burner as possible; too close a distance extinguishes the flame.

In another modification of the process, the burner tip is a round or cylindrical tube which produces a conical-shaped flame. A stream of gaseous ammonia is blown co-currently around this flame.

In another modification of the process, the burner consists of a bundle of round or cylindrical tubes of a suitable diameter. This bundle is surrounded by a close fitting mantle, and ammonia is blown between and around the tubes.

The following examples illustrate results obtained in pilot plant operations designed for the production of hydrazine in accordance with the principles of the invention:

EXAMPLE 1

In this operation, a flat flame produced by a burner tip having an opening of 0.24" x 0.019" was employed. Hydrogen and oxygen were burned at the rate of 10.16 cubic feet per hour of hydrogen and 5.08 cubic feet per hour of oxygen to produce a flame. The flame was quenched by a flat stream of gaseous ammonia preheated to 160° F. directed at a right angle to the plane of the flat flame at a distance of approximately $\frac{1}{16}$" from the base of the flame. The condensed product, after removal of dissolved ammonia, consisted of water containing 2.25% of hydrazine hydrate by weight. Of the total ammonia used for quenching, 1.58% was decomposed to hydrogen and nitrogen.

EXAMPLE 2

In this operation, the burner employed consisted of 7 closely packed tubes with an inside diameter of 0.044", surrounded by a tight fitting hexagonal shaped mantle. Hydrogen and oxygen were burned at the rate of 20.5 cubic feet per hour of hydrogen and 10.25 cubic feet per hour of oxygen. A stream of gaseous ammonia, preheated to 160° F., was blown around and between the burner tubes. The condensed product, after removal of dissolved ammonia, consisted of water containing 2.19% of hydrazine hydrate by weight. Of the total amount of ammonia blown around the flame, 1.23% was decomposed to hydrogen and nitrogen.

EXAMPLE 3

In this operation, a single round burner tube having an inside diameter of 0.059" was employed. Ammonia, preheated to 160° F., was blown around the flame through a sleeve surrounding the burner tip. A flame was produced by burning hydrogen at the rate of 6.92 cubic feet per hour and oxygen at the rate of 3.36 cubic feet per hour. The condensed product, after removal of dissolved ammonia, consisted of water containing 2.10% of hydrazine hydrate by weight. Of the total amount of ammonia blown around the flame, 1.01% were decomposed to hydrogen and nitrogen.

Experimental evidence indicates that the amount of ammonia decomposed to hydrogen and nitrogen per unit of oxygen burned decreases as the amount of hydrazine produced per unit of oxygen used increases. This fact indicates that the amount of ammonia decomposed per unit of hydrazine produced will decrease very rapidly as a higher concentration of hydrazine is obtained, thereby making the process more attractive economically.

The invention will be better understood from a consideration of the following description in conjunction with the accompanying drawings in which:

Fig. 1 is a side elevation view of a hydrogen-oxygen burner including the flame pattern produced thereby;

Fig. 2 is a projected plan view of the burner and flame pattern illustrated in Fig. 1;

Fig. 3 is an elevation view of an ammonia spray device shown in operative relationship with respect to the flame pattern produced by the burner of Figs. 1 and 2;

Fig. 4 is a side elevation view of a combined hydrogen-oxygen burner, capable of producing a normally conical flame pattern, and a concentric ammonia spray device for effecting concurrent quenching of the flame;

Fig. 5 is a projected cross-sectional view of the burner-ammonia spray arrangement of Fig. 4, taken along the line 5—5 of Fig. 4;

Fig. 6 is a side elevation view of a nest or plurality of hydrogen-oxygen burners and associated ammonia spray device adapted to deliver a quenching stream of ammonia capable of enveloping the flame patterns issuing from the plurality of burners;

Fig. 7 is a projected cross-sectional view of the burner nest of the arrangement illustrated in Fig. 6, taken along the line 7—7 of Fig. 6.

Figure 8:
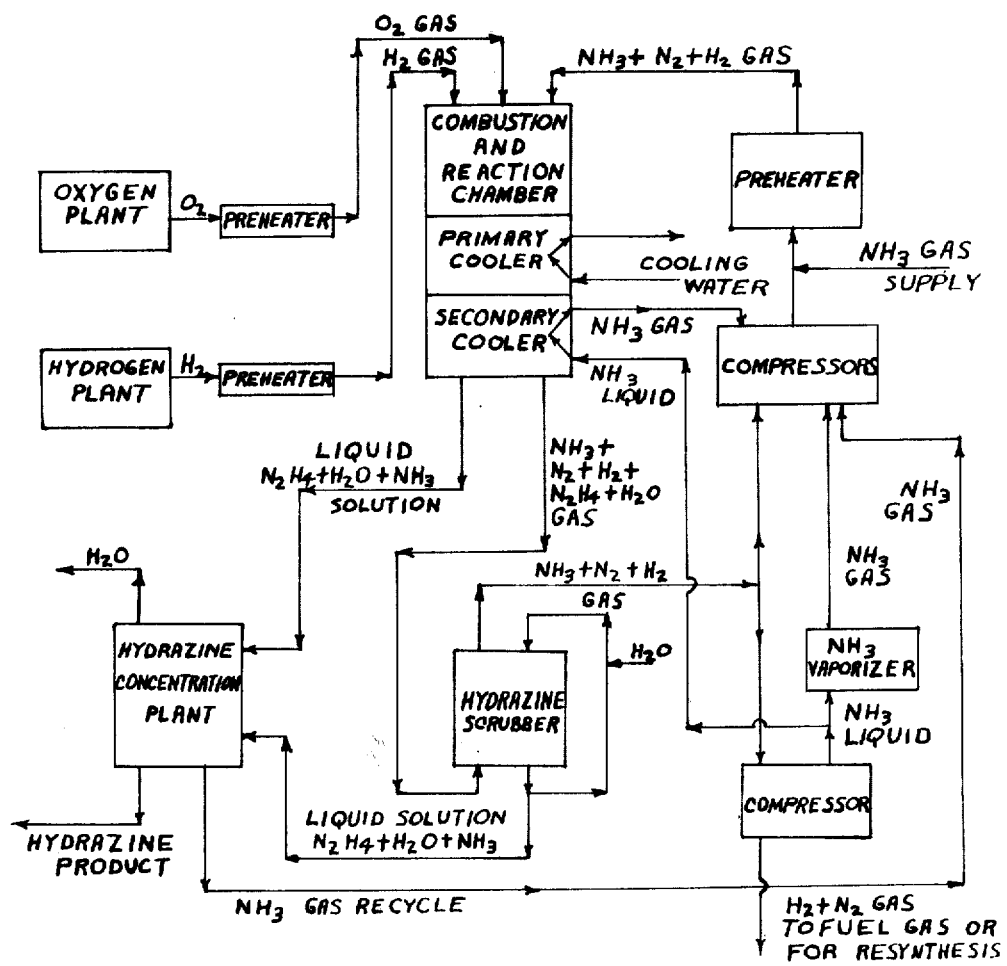
Fig. 8 is a schematic flow diagram or flow sheet illustrating a process for producing hydrazine in accordance with the invention.

In the drawing, Figs. 1 and 2 show a rectangular burner 10 having a relatively short vertical axis and a relatively long horizontal axis, and capable of producing a flat flame, the normal or free flame being indicated in dotted lines by the numeral 11 and the cone of the flame being indicated in solid lines by the numeral 12. An ammonia spray device 13 as illustrated in Fig. 3, is provided with a flat spray nozzle 14 which delivers a flat spray 15 having in cross-section long and short axis with the long axis greater in length than the width of the flame and being directed into contact with the flame in such manner as to project beyond the side edges of the flame with its long axis intersecting the longitudinal axis of the flame adjacent to the surface of the inner cone of the flame and with its long axis and its median plane forming right angles with the longitudinal axis of the flame. As indicated, the normal length of the flame is reduced as the result of contact of the ammonia spray with the flame.

In Figs. 4 and 5 there is shown a cylindrical hydrogen-oxygen burner 16 capable of producing a relatively long free flame 17 which is reduced in length to the length illustrated by the numeral 18 by means of a stream or flowing body of ammonia passing through an annular space 20 formed by a cylindrical outer tubular element 21 mounted in spaced relationship to and in axial alignment with the cylindrical burner 16. The inner cone of the flame is indicated by the numeral 22.

Figs. 6 and 7 show a device comprising a nest or plurality of hydrogen-oxygen burners 23 to which a combustible mixture of hydrogen and oxygen is delivered through a communicating cylindrical tube 24 to form a plurality of flame jets. An outer co-axial cylindrical tube 25 forms an annular space 26 through which ammonia is delivered around and between the individual burners forming the nest of burners 23. The inner cones of the flames produced by the burners 23 are indicated by the numeral 27.

The lengths of normal free flames produced by burners of the types of those illustrated in Figs. 4 and 5 and Figs. 6 and 7 are reduced by means of the envelopes of ammonia formed there-around. The use of an enveloping film or stream of ammonia provides certain advantages, as compared with streams of ammonia directed across flames (as shown in Figs. 1, 2 and 3) by providing aid for extending and maintaining the flame and thus counteracting the tendency to extinguish the flames.

The specific procedure outlined in Fig. 8 will be clear from a consideration of the legends applied thereto and the flow chart forming a part thereof. The flow sheet of Fig. 8 shows a process for producing hydrazine in which preheated hydrogen and pre-heated oxygen are reacted in a suitable combustion chamber in the presence of ammonia in the gaseous state, and the gaseous reaction product is first contacted with a primary cooler employing water as an internal cooling agent (as in a tubular heat exchanger) and, thereafter, is contacted with a secondary cooler employing liquid ammonia as an internal cooling agent (as in a tubular heat exchanger). A liquid product containing hydrazine and a gaseous product containing hydrazine are produced, and the two products are treated appropriately to effect the recovery of hydrazine. Provision is made for the separation and recovery of unaltered ammonia associated with the hydrazine and for the utilization of hydrogen and nitrogen associated with the hydrazine for the regeneration of ammonia for re-use in the process.

In the process of the invention involving the use of an open flame in the production of hydrazine, I prefer to employ combustible mixtures capable of producing temperatures not lower than about 2800° C. in the portion of the flame immediately adjacent to the surface of the inner cone of the flame. Such temperatures can be developed by employing combustible mixtures consisting of substantially pure oxygen and substantially pure hydrogen in stoichiometric proportions. Such temperatures can be developed, also, by employing oxygen and combustible material other than hydrogen such, for example, as hydrocarbons through pre-heating of the components of the combustible mixture. Pre-heating of the components of combustible mixtures which also contain diluent materials such, for example, as nitrogen, when air or oxygen-enriched air is used as the source of oxygen, can be utilized for developing temperatures higher than those directly attainable when the components are ignited at normal atmospheric temperatures. Similarly, pre-heating may be employed to aid in developing higher temperatures than those attainable through the ignition at normal atmospheric temperatures of combustible mixtures consisting of pure components in stoichiometric proportions.

I claim:

1. The method of producing hydrazine that comprises forming an open combustion flame by igniting and burning a mixture of oxidizing material and combustible material capable of producing flame temperatures substantially in excess of the decomposition temperature of hydrazine, directing a separate stream of ammonia at a high velocity into contact with said combustion flame while said flame is maintained at a temperature substantially higher than the decomposition temperature of hydrazine and forming a high-temperature gaseous reaction product containing (1) hydrazine resulting from transformation of a portion of the ammonia, (2) unaltered ammonia, and (3) products of combustion resulting from ignition and burning of the mixture of oxidizing material and combustible material, removing the high-temperature gaseous reaction product from the flame zone to a cooling zone and cooling the product to a temperature at which hydrazine contained therein is stable, and separating a hydrazine-containing product from other substances associated therewith in the cooled product, ammonia being introduced into contact with the combustion flame, (1) at a rate such as to provide a time of contact of the ammonia with the flame substantially shorter than one one-hundredth ($\frac{1}{100}$) of a second, (2) at a temperature substantially below the temperature of said combustion flame, and (3) in an amount in excess of that required for reaction, such as to aid materially in cooling the gaseous reaction product to a temperature at which hydrazine contained therein is relatively stable.

2. The method as claimed in claim 1 wherein the combustible material is selected from the group consisting of hydrogen, carbon monoxide, methane, ethane, propane, butane, and acetylene.

3. The method as claimed in claim 1 wherein the separate stream of ammonia is directed into contact with the flame immediately adjacent to the inner combustion cone of the flame and in co-current relationship with respect to the flame flow.

4. The method as claimed in claim 1 wherein the separate stream of ammonia is directed into contact with the flame immediately adjacent to the inner combustion cone of the flame and in a direction substantially normal to the flame flow.

5. The method of producing hydrazine that comprises forming an open combustion flame by igniting and burning a mixture of oxidizing material and combustible material capable of producing flame temperatures substantially in excess of the decomposition temperature of hydrazine, directing a separate stream of ammonia at a high velocity into contact with said combustion flame while said flame is maintained at a temperature substantially higher than the decomposition temperature of hydrazine and forming a high-temperature gaseous reaction product containing (1) hydrazine resulting from transformation of a portion of the ammonia, (2) unaltered ammonia, and (3) products of combustion resulting from ignition and burning of the mixture of oxidizing material and combustible material, removing the high-temperature gaseous reaction product from the flame zone to a cooling zone and cooling the product to a temperature at which hydrazine contained therein is stable, and separating a hydrazine-containing product from other substances associated therewith in the cooled product, ammonia being introduced into contact with the combustion flame, (1) at a rate such as to provide a time of contact of the ammonia with the flame substantially shorter than one one-hundredth ($\frac{1}{100}$) of a second, (2) at a temperature substantially below the temperature of said combustion flame, and (3) in an amount in excess of that required for reaction, such as to aid materially in rapidly cooling the gaseous reaction product at which hydrazine contained therein is relatively stable.

References Cited in the file of this patent

UNITED STATES PATENTS 2,596,421      McKinnis _____ May 13, 1952

OTHER REFERENCES

"The Chemistry of Hydrazine," by L. F. Audrieth and B. A. Ogg, 1951 ed., pages 20, 21, 24 and foot-note on page 39, John Wiley and Sons, Inc., N. Y.

"The Chemistry of Hydrazine," by L. F. Audrieth and P. H. Mohr, page 3746, Chem. and Eng. News, vol. 26, No. 50, Dec. 13, 1948.

J. W. Mellor's "A Comprehensive Treatise on Inorganic and Theoretical Chem.," vol. 8, pages 208–211, 221, Longmans, Green and Co., N. Y.

Disclaimer 2,779,660.—*John Robell*, West Hempstead, N. Y. METHOD OF PRODUCING HYDRAZINE. Patent dated Jan. 29, 1957. Disclaimer filed Mar. 20, 1957, by the assignee, *Guggenheim Brothers (1949)*.

Hereby enters this disclaimer to claim 5 of said patent.

[*Official Gazette April 16, 1957.*]